Nov. 15, 1938.   L. SAIVES   2,136,760
LOCKING DEVICE FOR VEHICLE WHEELS
Filed Sept. 12, 1932   3 Sheets-Sheet 1
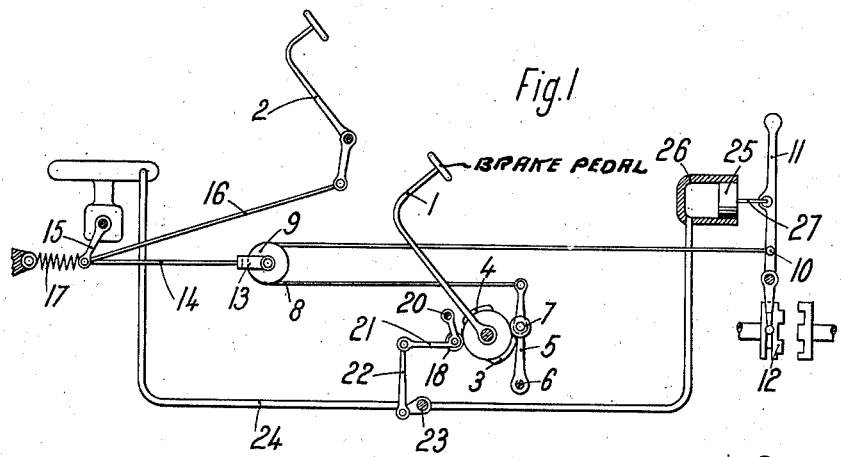
Fig.1
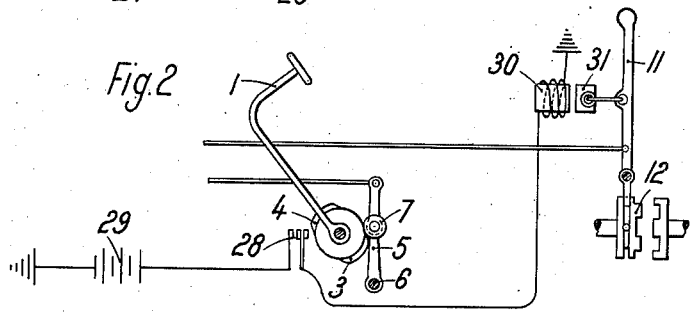
Fig.2
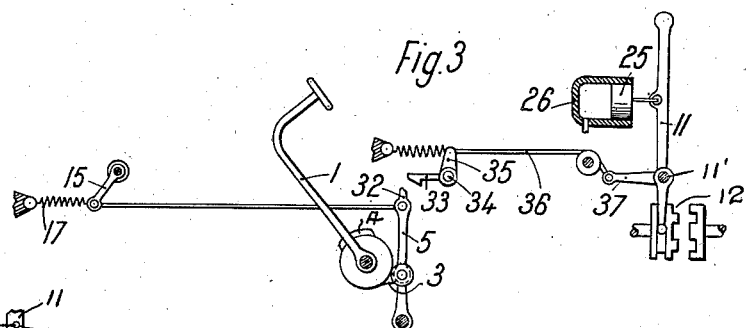
Fig.3
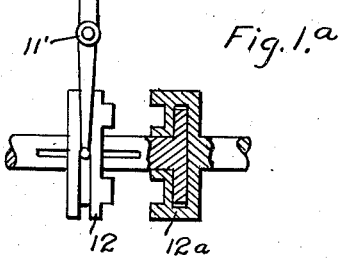
Fig.1.a
Leon Saives,
Inventor
A. M. Bunn,
Attorney

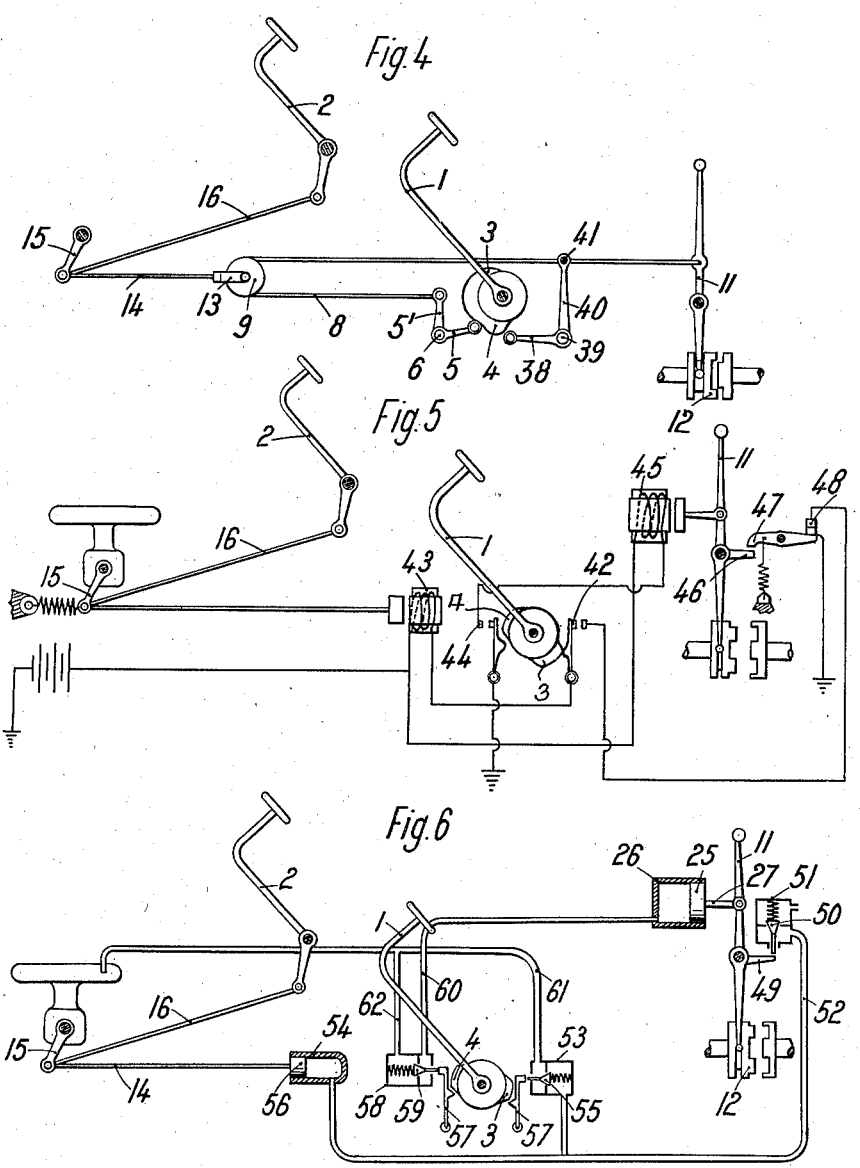

Nov. 15, 1938.　　　　　L. SAIVES　　　　　2,136,760
LOCKING DEVICE FOR VEHICLE WHEELS
Filed Sept. 12, 1932　　　3 Sheets-Sheet 3
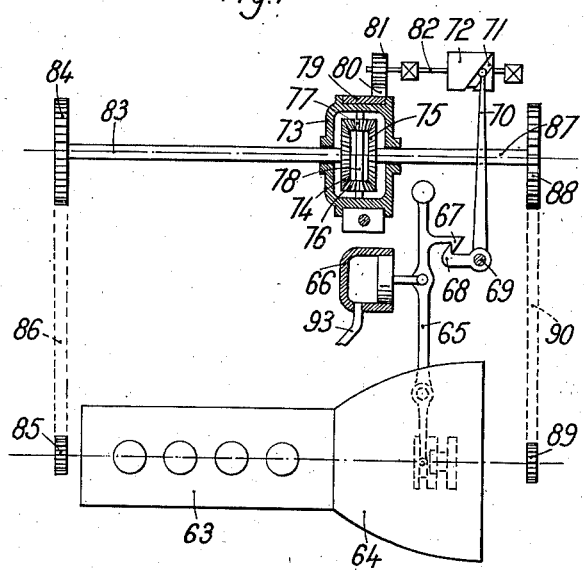
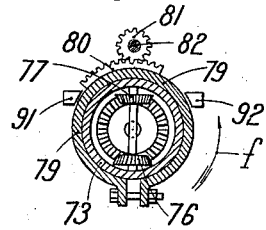
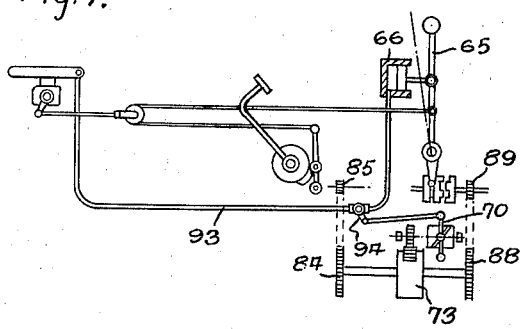
Leon Saives,
Inventor.
A. M. Bunn,
Attorney.

Patented Nov. 15, 1938

2,136,760

UNITED STATES PATENT OFFICE 2,136,760

LOCKING DEVICE FOR VEHICLE WHEELS

Léon Saives, Billancourt, France, assignor to Louis Renault, Billancourt, France Application September 12, 1932, Serial No. 632,867
In France October 29, 1931

17 Claims. (Cl. 192—.01)

The present invention relates to improvements in automatic apparatus for locking the free wheeling of motor vehicles.

In the use of motor vehicles provided with free wheeling devices, the engine cannot be used as a brake, which is a great drawback, and the steering of the vehicle becomes much more dangerous. To obviate this disadvantage, the major part of the vehicles provided with free wheeling devices include means by which the free wheeling can be put out of action when required, such means consisting, in principle, of a jaw clutch which is adapted to connect the two parts of the driving gear separated by the free wheeling, and is under the driver's control, the driver being thus enabled to operate the vehicle with or without the free wheeling device.

However, the problem is not completely solved by the arrangement above referred to, for when the vehicle is operating by the use of the free wheeling, if the driver wishes to brake the vehicle, and is to employ the engine as a brake, he must first lock the free wheel and then throw on the brakes. If the braking is to be very rapid, in order to avoid an accident, the action of locking the free wheeling will delay the braking, and while the accident might have been avoided without the free wheeling, the element of uncertainty is eliminated under conditions referred to.

The improvements, the subject-matter of the invention, have for their object the elimination of the free wheeling, this being effected when the driver acts upon the brake pedal. In this manner, the vehicle can be handled with as great safety as one which is not equipped with this device, thus affording the benefit of all the advantages inherent in said free wheeling device.

Furthermore, in conformity to the invention, the free wheeling can be locked only when the engine has attained a speed which is very near the speed of the intermediate driving gear of the engine, and thus the locking operation can be performed without shocks.

To obtain this result, I add to the aforesaid devices a synchronizing mechanism adapted to hold the locking lever in place when the engine is running slower than the said intermediate gear, and to release said lever when the engine comes near this desired speed.

The synchronizing mechanism is actuated on the one hand by the engine, and on the other hand by the intermediate gear, in such conditions that it will come into action somewhat before the engine has attained the speed of the intermediate gear.

The said synchronizing mechanism may act upon the locking lever by means of a pawl or catch device, by direct action upon a valve mounted on the vacuum pipe of the cylinder controlling the locking lever, or by acting upon electric contacts included in the circuit of an electromagnet controlling the said lever, or by other means.

Fig. 1 is a diagrammatic view illustrating a combined mechanical and pneumatic arrangement, adapted for locking the free wheeling.

Fig. 1a is a detail sectional view of the free wheeling device and locking means therefor.

Fig. 2 relates to a modification in which the mechanism for locking the free wheeling is controlled by an electromagnet.

Fig. 3 is another modification in which the pulley and fork device is replaced by a catch device.

Fig. 4 shows a simplified arrangement in which the control is entirely effected by the brake pedal.

Fig. 5 relates to a modification in which the action upon the clutch lever for the locking of the free wheeling, and upon the lever of the carbureter valve, is effected by an electromagnet and electric contacts.

Fig. 6 is an analogous arrangement in which vacuum cylinders are employed for the control.

Fig. 7 relates to the use of a synchronizing mechanism adapted to hold the locking lever for the free wheeling.

Fig. 7a is a modified form of the device shown in Fig. 7; and

Fig. 8 is a cross section of the said mechanism.

In the construction indicated in Fig. 1, the brake pedal is shown at 1, and the accelerator pedal at 2.

To the shaft of the brake pedal 1 are keyed two cams 3 and 4; the cam 3 cooperates with a roller 7 mounted on a lever 5 which is pivoted at 6. To the end of the lever 5 is attached a cable 8 which passes over a pulley 9 mounted in a forked member 13, the other end of the cable being attached at 10 to a lever 11 mounted on a shaft 11' and adapted to operate a clutch 12 which serves to lock the free wheeling device 12a shown in detail in Fig. 1a as a conventional type of one way clutch. The clutch member 12 operates to lock this clutch so that the drive shaft and driven shafts are connected so as to turn together at the same speed. In the various other figures of the drawings for the sake of simplicity only the clutch locking feature is illustrated.

On the axle of the pulley 9 is mounted a forked member 13 connected by a cable 14, with a lever 15, secured to the rotary valve by the carbureter, said lever being further connected by a second cable 16 with the accelerator pedal 2. A reaction spring 17 urges the lever 15 in such manner as to maintain the said valve of the carbureter always in the closed position.

The outline of the cam 3 is such that it will provide for a sufficient opening of the carbureter valve in order to run the engine without load at high speed, and thus to increase in any case the speed of the engine up to the speed of the vehicle wheels.

The cam 4 cooperates with a roller 18 mounted on a bell-crank 21, pivoted at 20, one of whose arms is pivoted at the end to a link 22 controlling a cock 23 mounted on a pipe 24 which connects the intake manifold of the engine with a vacuum cylinder 26 having a piston 25 connected with the lever 11 by a link 27.

When the vehicle is travelling and utilizing the free wheeling, the clutch 12 is thrown out of action, and the valve of the carbureter is closed. If the driver wishes to brake the vehicle, he presses upon the pedal 1, and the cam 3 acts upon the roller 7, hence moving the lever 5 to the right, thereby acting through the cable 8, the pulley 9, the cable 14 and the lever 15, to open the valve of the accelerator. It must be remarked that the opening of the throttle valve due to the cam 3 is sufficient for running the engine without load at a high speed; consequently if the engine speed is less than the wheel speed, the cam 3 will run the engine without load at a speed equal to the wheel speed and therefore it is clear that the increase in the engine speed is not fixed. The adjusting of cams 3 and 4 may be such that the vehicle is already slackened by the brakes whereas the engine is accelerated up to the wheel speed. If the vehicle is being driven by the engine at a relatively low speed, the speed of the vehicle is not increased by the movement of the foot pedal because the opening of the throttle valve due to the cam 3 is able to run the engine without load at a high speed but is unable to increase the speed of the engine together with the speed of the vehicle in a substantial rate. In actual use the driver releases the accelerator pedal before acting on the brake pedal in such a manner that the engine, when the brake pedal is depressed, turns always at a lower speed than the vehicle wheels. The speed of the engine is thus increased, and it runs at the same speed as the vehicle. By continuing the movement of the pedal 1, the cam 4 acts upon the roller 18, thus turning the lever 21, and hence, through the link 22, turning the cock 23 which thus opens and produces a vacuum in the cylinder 26. The piston 25 thus moves to the left together with the lever 11 thus operating the clutch 12, and locking the free wheeling. This controlling action takes place without any abrupt motion, as the speed of the engine corresponds to the speed of the vehicle.

The lever 11, by its movement, slackens the cable 8, and, by means of the lever 15, closes the valve of the carbureter. In this manner, the engine produces a braking effect.

It will be observed that the action of the two cams 3 and 4 takes place successively, the cam 3 acting in the first place, and then the cam 4. This action should take place as soon as the pedal 1 begins to move, that is, during the stroke of this pedal which corresponds to the motion of the brake shoes towards the drums. When the brake pedal 1 is released, the free-wheeling remains locked until the valve 23 is closed and during the locking of the free-wheeling, the cable 8 cannot open the throttle valve; when cam 4 no longer acts on roller 18, the valve 23 is closed and the brake pedal returns quickly to its normal position (Fig. 1) before the releasing of the free-wheeling, said releasing necessitating a certain delay; when the free-wheeling is locked, the action of cam 3 has only for effect to stretch the cable 8.

Fig. 2 shows a modified construction employing an electromagnet operating on the battery current and adapted to control the lever 11 for the locking of the free wheeling.

Herein the cam 4 controls an electric contact device 28 which sends the current from the battery 29 into an electromagnet 30, thereby attracting an armature 31 which is connected with a clutch lever 11 for the locking of the free wheeling, the operation resembling that of the arrangement shown in Fig. 1.

Obviously, the devices above described are given only by way of example and for the better understanding of the invention, and the invention includes all devices adapted for locking the free wheeling by the use of the brake pedal during the first part of the stroke of the pedal, while acting at the same time upon the accelerator and thus operating the engine at the same speed as the vehicle, then acting upon a special clutch lever by vacuum or by magnetic action, thus locking the free wheeling and at the same time bringing the accelerator into its closed position.

For this purpose, the pulley and fork device 9 may be replaced by a rocking arm or by a suitable differential device.

A device adapted for pawl release can also be employed, as shown in Fig. 3, and herein the cam 3, controlling the lever 5 of the accelerator, has an outline of such form as to allow this lever to at once return to the rear.

At the upper end of the lever is a catch 32 cooperating with a pawl 33 pivoted at 34 and carrying an arm 35 which is connected by a cable 36 with the arm 37 of the free wheeling lever 11.

The operation is as follows: When the driver presses upon the brake pedal 1, the lever 5 turns to the right, thus opening the accelerator, and the catch 32 engages the pawl 33. When the clutch lever 11 takes the position for locking the free wheeling, the lever 37 draws upon the cable 36 and raises the pawl 33 which is thus released from the catch 32 and allows the lever 15 of the carbureter valve to return to the closing position.

Fig. 4 shows a simplified arrangement, in which the brake pedal is used for all the controlling effects.

Upon the shaft of the brake pedal 1 are mounted two cams 3 and 4. The cam 3 acts upon a bell-crank lever 5, pivoting at 6, to one of whose arms 5¹ is attached a cable 8 which passes over a pulley 9 mounted in a fork 13, the other end of the cable being attached to a clutch lever 11 for locking the free wheeling. The fork 13 of the pulley 9 is connected as before stated with the lever 15 of the carbureter valve by a cable 14. The cam 4 acts upon a bell-crank 38 pivoting at 39, one of whose arms 40 is connected at 41 with the cable 8.

The operation is as follows. When the driver operates the brake pedal 1, the lever 5 rocks on its pivot 6, and the pulley and fork device 9—13 is drawn to the right and acts upon the lever 15 of the carbureter valve, so that the engine will run at the same speed as the vehicle. When the brake pedal 1 moves further, the lever 38 will now turn, thus moving the lever 11, thereby throwing on the clutch 12 and locking the loose wheel. When this locking has taken place, the cable 8 becomes slackened, and the lever 15 returns the carbureter valve to the closed position.

In the arrangement shown in Fig. 5, the action upon the lever 15 of the carbureter valve and the clutch lever 11 is caused entirely by means of electromagnets and contact devices.

When the driver acts upon the brake pedal 1, the cam 3 closes the circuit at a contact device 42, thus energizing an electromagnet 43 controlling a lever 15, and the carbureter valve will hence be opened. As the pedal 1 continues to move, as shown in Fig. 7a, the cam 4 closes the circuit at a contact device 44, thus energizing an electromagnet 45, hence turning the lever 11 and locking the free wheeling. At this time, an appendage 46 of the lever 11 acts upon a lever 47 which rotates pivotally and thus opens the circuit at a contact device 48, thereby cutting off the current from the electromagnet 43. The lever 15 of the carbureter valve thus returns to the closed position.

Fig. 6 represents an arrangement similar to the preceding, but in which the carbureter valve lever 15 and the free wheeling locking lever 11 are controlled by vacuum cylinders which are substituted for the electromagnets 43 and 45.

The pedal 1 acts through a cam 3 upon a lever 57 adapted for the control of a valve 55 by which a cylinder 53 is connected with a pipe 61 leading to the suction collector of the engine. A vacuum is produced in a cylinder 54, thus drawing in its piston 56, which—through a cable or rod 14—acts upon the lever 15 and opens the carbureter valve. On continuing its movement, the pedal 1 acts by means of its cam 4 upon a lever 57 which operates a valve 59 and thus connects a cylinder 58, through a pipe 62, with the suction end of the engine. A vacuum is produced—through a pipe 60—in a cylinder 26, thus drawing in its piston 25 which is connected by a rod 27 with the clutch lever 11 which effects the locking of the free wheeling device. When the said lever 11 turns, it acts, through an arm 49, upon the valve 50 of a cylinder 51 which affords an atmospheric outlet and which, through a pipe 52, drives out the piston 56 of the cylinder 54 which—through the rod 14—places the carbureter valve lever 15 in the closed position.

In the arrangement shown in Figs. 7 and 8, the engine is represented in plan view at 63; 64 is a casing which contains the clutch and the change-speed box; 65 is the free wheeling locking lever. For the sake of clearness, the lever 65 is shown in the horizontal plane, but normally it occupies the vertical plane. 66 is the automatic controlling device for the lever 65, which in this case is a vacuum cylinder.

The lever 65 is provided with a catch 67 which is normally engaged with the end of a lever 68 pivoting at 69 and carrying an arm 70 the upper end of which engages the helical groove 71 of a drum 72 which latter is operated from the casing 73 of the synchronizing mechanism. The synchronizing mechanism herein represented is of the differential type.

The casing 73 contains a planetary gear set consisting of two main wheels 74—75, as well as two planetary pinions 76—77 mounted loosely on an axle 78 secured to the casing. The outer periphery of said casing is smooth, and it cooperates with a friction collar 79 carrying a toothed sector 80 in constant engagement with a gear wheel 81 keyed to the shaft 82 of the said drum 72.

The main wheel 74 is keyed to a shaft 83 on the end of which is mounted a chain wheel 84, said shaft being driven by the engine through a chain wheel 85 and chain 86.

The main wheel 75 is keyed to the shaft 87 and a sprocket wheel 88, carried by said shaft and, by the engine gearing through the chain wheel 89 and chain 90.

The gear ratio of the wheels 89—88 somewhat exceeds the ratio of the wheels 85—84.

It should be observed that when the engine is running slower than the said intermediate gear, the box 73 of the differential will turn in the direction of the arrow f, thus forcing the friction collar 79 to take the position shown in Fig. 8, the end of the sector 80 being against the fixed stop 91. A second fixed stop 92 serves to hold the said collar in place when the engine reaches the same speed as the intermediate gear.

The operation is as follows:

When the driver presses down the brake pedal (not shown) the engine runs loose, and when it comes to a speed which is less than that of the intermediate gear but is such that the shaft 87 will rotate at a higher speed than the shaft 83 (which is possible, since the gear ratio of the wheels 88—89 exceeds the ratio of the wheels 85—84) the casing 73 rotates in the contrary direction to the arrow f, thus actuating the friction collar 79 which—through its sector 80—rotates the wheel 81 and hence the drum 72, and this latter, by means of its groove 71, turns the lever on its axle 69 and releases the locking lever 65. At this time, the engine and the transmission driving the wheels will operate at the same speed, and the locking of the loose wheel by means of the lever 65 will take place without shocks.

The synchronizing mechanism, instead of acting to hold the lever 65 in place, may act upon a cock or a valve mounted on the vacuum pipe 93 of the cylinder 66; herein the synchronizing mechanism will only control the motion of the lever 65, and it is thus possible to eliminate the second cam located on the shaft of the brake pedal, that is, the cam controlling the said locking lever. It will be understood that the cylinder 66 of Figs. 7 and 8 is functionally the same as cylinder 26 of Figure 1 and that vacuum pipe 93 of Figs. 7 and 8 is connected as pipe 24 to a brake and accelerator structure such as shown, for example, in Figure 1.

I claim:

1. In an automotive vehicle having a variable speed internal combustion engine for driving it and a free wheeling device permitting the vehicle to travel at speeds relatively exceeding the engine speed, a lever for locking the vehicle free wheeling device, a carbureter having an accelerator for controlling the speed of the internal combustion engine, a brake pedal lever for applying the vehicle brakes, means actuated by said brake lever for operating the carbureter accelerator for bringing the engine speed up to the relative speed of the vehicle as the brake lever is being actuated in applying the brakes, and means actuated through the movement of said lever for closing the carbureter.

2. In an automotive vehicle having a variable speed internal combustion engine for driving it and a free wheeling device permitting the vehicle to travel at speeds relatively exceeding the engine speed, a lever for locking the vehicle free wheeling device, a carbureter having an accelerator for controlling the speed of the internal combustion engine, a brake pedal lever for applying the vehicle brakes, means actuated by said brake lever for operating the carbureter accelerator for bringing the engine speed up to the relative speed of the vehicle as the brake lever is being actuated in applying the brakes, means for locking said locking lever until the engine and vehicle are running at the same relative speeds, and means actuated through the movement of said lever for closing the carbureter.

3. In an automotive vehicle having a variable speed internal combustion engine for driving it and a free wheeling device permitting the vehicle to travel at speeds relatively exceeding the engine speed, a lever for locking the vehicle free wheeling device, a carbureter having an accelerator for controlling the speed of the internal combustion engine, a brake pedal lever for applying the vehicle brakes, means actuated by said brake lever for operating the carbureter accelerator for bringing the engine speed up to the relative speed of the vehicle as the brake lever is being actuated in applying the brakes, means actuated through the movement of said lever for actuating said locking lever to lock the vehicle free wheeling device, and means actuated through the movement of said lever for closing the carbureter.

4. In an automotive vehicle having a variable speed motor for driving it and a free wheeling device permitting the vehicle to travel at speeds relatively exceeding the motor speed, means for locking the vehicle free wheeling device, a brake actuator for applying the brakes, means for momentarily bringing the speed of the motor to the relative speed of the vehicle as the brake actuator is being actuated in applying the brakes, and means for actuating the free wheeling locking means as the brake actuator is being actuated.

5. In an automotive vehicle having a variable speed motor for driving it and a free wheeling device permitting the vehicle to travel at speeds relatively exceeding the motor speed, means for locking the vehicle free wheeling device, a brake actuator for applying the brakes, means for bringing the speed of the motor to the relative speed of the vehicle as the brake actuator is being actuated in applying the brakes, means for actuating the free wheeling locking means as the brake actuator is being actuated, and means for decreasing the speed of the motor when said free wheeling locking means is actuated.

6. A device for the automatic locking of the free-wheeling elements employed upon motor vehicles having drive and driven shafts and a carbureter valve, comprising a brake pedal, a clutch lever operable to lock the free-wheeling elements, means actuated by said pedal adapted for opening the carbureter valve, said means being also adapted for actuation by said pedal to operate said lever, means actuated through movement of said lever for again closing the carbureter valve and means for locking said lever until said shafts to be clutched have substantially the same speed, said last mentioned means comprising a differential box having a friction collar on its periphery, said collar having a toothed sector, a pair of stops between which said sector may be displaced, a shaft having a pinion in engagement with said toothed sector, a drum secured to said pinion shaft, said drum having a groove, said clutch lever having a locking arm, one end of said arm engaging in said groove.

7. The combination with free wheeling mechanism, means controlling the acceleration of an engine and a brake operating member, of means for successively moving said acceleration controlling means in an accelerating direction and throwing said free wheeling mechanism out of operation upon movement of said brake operating member toward braking position.

8. The combination with free wheeling mechanism, means controlling the acceleration of an engine and a brake operating member, of means for successively moving said acceleration controlling means in an accelerating direction and throwing said free wheeling mechanism out of operation upon movement of said brake operating member toward braking position, comprising a controlling member for said free wheeling mechanism, means on said brake operating member engageable with said free wheeling controlling member to actuate the same and means on said brake operating member engageable with said acceleration controlling means to move the same in an accelerating direction.

9. The combination with a brake operating member, of free wheeling means and means for throwing said free wheeling means out of operation automatically upon actuation of said brake operating member in braking direction comprising a free wheeling controlling member, said means being associated with said controlling member to permit the movement of said controlling member to throw said free wheeling means either into or out of operation independently of said brake operating member when said brake operating member is in inoperative position.

10. The combination with a brake operating member and an accelerator operating member, of free wheeling means and means for moving said accelerator operating member in an accelerating direction and throwing said free wheeling means out of operation automatically upon actuating said brake operating member in braking direction.

11. The combination with a brake operating member and an accelerator operating member, of free wheeling means and means for temporarily moving said accelerator operating member in an accelerating direction and thereupon throwing said free wheeling means out of operation automatically upon actuating said brake operating member in braking direction.

12. The combination with free wheeling mechanism, a brake operating member, and means for controlling the acceleration of an engine, of means actuated by said brake operating member for successively moving said acceleration controlling means in an accelerating direction and throwing said free wheeling mechanism out of operation.

13. The combination with free wheeling mechanism, a brake operating member, and means for controlling the acceleration of an engine, of means actuated by said brake operating member for first moving said acceleration controlling means in an accelerating direction for a transitory period and after such movement thereof throwing said free wheeling mechanism out of operation.

14. The combination with a brake mechanism, accelerator means and a free wheeling mechanism, of means for temporarily operating said accelerator means and subsequently throwing said free wheeling mechanism out of operation upon throwing said brake mechanism into operation.

15. The combination with free wheeling mechanism, of a brake operating member, a cam movable with said brake operating member and means actuated by said cam upon movement of said brake operating member a predetermined distance in a braking direction to throw said free wheeling mechanism out of operation.

16. The combination with free wheeling mechanism and an accelerator operating member, of a brake operating member, a cam movable with said brake operating member, means actuated by said cam upon movement of said brake operating member a predetermined distance in a braking direction to throw said free wheeling mechanism out of operation, and means on said cam engaging said accelerator operating member to move the same a predetermined distance in an accelerating direction before said free wheeling mechanism is thrown out of operation.

17. The combination with free wheeling mechanism, of a brake operating member, a member movable with said brake operating member and a controlling mechanism engageable by the member movable with said brake operating member to throw said free wheeling mechanism out of operation upon movement of said brake operating member a predetermined distance in a braking direction and holding said free wheeling means from movement out of inoperative position until return of said brake operating member to inoperative position, said free wheeling mechanism comprising a controlling member associated with said controlling mechanism to permit the movement of said controlling member to throw said free wheeling means either into or out of operation independently of said brake operating member when said brake operating member is in inoperative position.

LÉON SAIVES.